3,143,553
BUTADIENE CARBOXYLIC ACIDS
Heinrich Ruschig and Ernst Jürgens, Bad Soden, Taunus, Germany, assignors to Farbwerke Hoechst Aktiengesellschaft vormals Meister Lucius & Brüning, Frankfurt am Main, Germany, a company of Germany
No Drawing. Filed June 2, 1961, Ser. No. 114,303
Claims priority, application Germany June 4, 1960
4 Claims. (Cl. 260—332.2)

The present invention relates to novel butadiene carboxylic acids of the formula

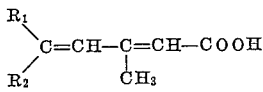

wherein $R_1$ represents a phenyl radical and $R_2$ represents a phenyl radical or a five- or six-membered unsaturated heterocyclic radical, or wherein $R_1$ and $R_2$ represent phenyl radicals which may be linked together with the formation of a heterocyclic ring, in the phenyl nuclei of which one or two hydrogen atoms may be replaced by chlorine atoms, alkyl groups having from 1 to 4 carbon atoms, alkoxy groups having from 1 to 4 carbon atoms, or alkylmercapto groups having from 1 to 4 carbon atoms, nitro groups, amino groups, alkyl carboxy acylamino groups having from 1 to 4 carbon atoms, dialkylamino groups, the alkyl groups of which having from 1 to 4 carbon atoms or carboxy groups.

The present invention also relates to the manufacture of said novel butadiene carboxylic acids, wherein a 3-methyl-crotonic acid ester is condensed with ketones of the formula

in which $R_1$ and $R_2$ have the meanings given above, in the presence of hydrides, amides or alcoholates of the metals of the first group of the periodic system.

As starting material for the process of the present invention there may preferably be used the esters of the dimethyl acrylic acid with low molecular aliphatic alcohols, for example, methanol, ethanol or propanol Furthermore, there can also be used the corresponding esters with higher molecular alcohols or phenols. As reaction components of the dimethyl acrylic acid esters, ketones are used which can be replaced in the aryl radicals by one or more chlorine atoms; alkyl groups having from 1 to 4 carbon atoms, alkoxy groups having from 1 to 4 carbon atoms, or alkylmercapto groups having from 1 to 4 carbon atoms, nitro groups, carboxyl, amino, acylamino groups having from 1 to 4 carbon atoms, or dialkylamino groups, the alkyl groups of which having from 1 to 4 carbon atoms.

In detail, the following ketones can be used: benzophenone, dichlorobenzophenone, dimethoxybenzophenone, 4-dimethylamino-3-ethoxybenzophenone, 4-diethylamino-3-methoxybenzophenone, 4-di-n-propylamino - 3 - propoxybenzophenone, 4-di-n-butylamino - 3 - methoxybenzophenone, 4,4'-dichloro-3,3'-diaminobenzophenone, 2 - chlorobenzophenone, 4-chlorobenzophenone-2'-carboxylic acid, 2-benzoylthiophen, 2-benzoylpyridine, 2-3',4'-dichlorobenzoylthiophen, thioxanthone and 2-chlorothioxanthone.

It is of special advantage to use as starting material ketones of the before mentioned formula, wherein $R_1$ and $R_2$ have the same meaning.

The process of the present invention is preferably carried out in such way that the ketones are allowed to react on the dimethyl-acrylic acid esters in the presence of equimolar or excessive quantities of a basic condensing agent. As basic condensing agents there may be used for example, alkali metal amides or alcoholates, such as sodium or potassium amide, sodium or potassium methylate, ethylate, n-propylate, n-butylate or tert.-butylate. It is of particular advantage to use sodium methylate as condensing agent. It is not absolutely necessary to use solvents for the reaction process, but it may be of advantage.

As solvents there may be used for example, low molecular aliphatic alcohols, such as methanol or ethanol; cyclic ethers, such as dioxane or tetrahydrofurane; dialkyl formamide, such as dimethyl formamide or dimethylsulfoxide.

The reaction components can be caused to react with each other in equimolecular conditions, it can, however, be preferable in some cases to use the dimethylacrylic acid ester in a small excess, referred to the ketone.

The condensing agent is also preferably used in excess, whereby bi or trimolar quantities, referred to the ketone used, are of advantage, and particularly favorable yields are obtained. But it is also possible to use the alkali metal alcoholate in a larger excess, The reaction generally proceeds exothermally, so that it may be of advantage, to operate first with outside cooling, when causing the reaction components to combine, and then to heat the reaction mixture at moderately elevated temperatures in order to complete the reaction process. The reaction temperatures generally are between −20 and +100° C., preferably between +20 and +70° C. The reaction temperature depends on the type of the ketone used. The water, set free during the condensation, causes the hydrolysis of the ester group of the condensation product formed. In order to complete the reaction process, which is not always carried out completely, a small quantity of water is preferably added after the condensation reaction being finished, and the mixture is heated for a short time at moderately elevated temperatures, for example at temperatures between 50 and 70° C.

In order to isolate the butadiene carboxylic acids obtained, water is added to the reaction mixture, the unreacted starting materials are removed by filtering or shaking off with a suitable solvent and the filtrate is acidified with acetic acid or with a mineral acid, for example, hydrochloric acid. On acidifying, the product formed is separated and can be recrystallized and purified. According to the nature of the substituents $R_1$ and $R_2$ the compounds obtained are colorless to slightly yellow colored liquids or crystalline substances.

According to the process of the present invention there are generally obtained mixtures of cis-trans-isomeric acids. If desired, these acids can be separated by treating them with suitable solvents.

In view of the prior art, the success of the reaction process was so far surprising, as for example it was not possible to carry out the condensation of isopropylidene malonic acid esters with aldehydes, the aldehydes being essentially more reactive as compared with the ketones. (See G. Wittig and H. Hartman, Ber. dtsch. chem. Ges. 72 (1939), pages 1387.) It is already known to condensate aldehydes with isopropylidene cyanoacetic esters in the presence of a mixture of piperidine and piperidine acetate as condensing agent, but the isopropylidenecyanoacetic esters cannot be compared with the 3-methylcrotonic acid esters, used according to the process of the present invention, since the reactivity of the methyl groups is increased considerably by the presence of a cyanide group. The process of the present invention permits forming a $C_4$-chain and thus the formation from ketones of acids showing a prolonged chain.

The products obtained according to the process of the present invention are suitable medicaments showing a special chemotherapeutic activity. For example, the compounds 2-methyl-4,4,(4'-chloro)-diphenyl-butadiene carboxylic acid-(1) and 2-methyl-4-(3',4'-dichlorophenyl)-4-(2''-thienyl)-butadiene carboxylic acid (1) exhibit a marked fungicidal activity up to a lower concentration of about 31 to 62 γ/cc. upon different dermatophytes (*microsporon gypseum* and *lanosum, epidermophyton rubrum, trichophyton rotundum* and *metagrophytes plicatile*).

Furthermore the new products are suitable textile finishing agents with especially good properties as optical brighteners. They are also valuable intermediate products for the preparation of secondary products, for example, medicaments and textile finishing agents.

The novel butadiene carbocyclic acids can be administered as such or in the form of galenical preparations, for example, gelees, powders, ointments, pastes, mixtures that require shaking tinctures, solutions or suspensions in admixture or conjunction with non-toxic, pharmaceutically acceptable organic or inorganic carrier substances. For the production of such galenical preparations there may be used auxiliary materials which do not react with the new compounds, for example, water, gelatine, bolus, lactose, starch, magnesium stearate, talcum, vegetable oils, benzyl alcohol, gums, polyethylene-glycol, cholesterol, petroleum jelly, zinc oxide, titanium dioxide or other carriers known for medicaments. The new products of the invention or pharmaceutical preparations containing them may be sterilized and/or may contain assistants, such as stabilizers, buffers, wetting agents, emulsifiers or salts for regulating the osmotic pressure. The pharmaceutical preparations may be prepared by the usual methods.

The active compounds may be present in the pharmaceutical preparation, for example, in a proportion within the range of 0.1–5%. When the products of the invention are used in the form of gelees, a medium dose of 0.5% by weight has proved to be advantageous.

The following examples serve to illustrate the invention but they are not intended to limit it thereto:

EXAMPLE 1

2-Methyl-4-Diphenyl-Butadiene Carboxylic Acid-(1)

(a) 50 g. of sodium methylate were added to a solution of 91 g. of benzophenone and 65 g. of dimethylacrylic acid ethyl ester in 200 cc. of dimethylsulfoxide at room temperature while stirring. After heating for 2 hours at 60–70° C. the mixture was diluted with 2 liters of water. Glacial acetic acid used in excess, was added to the aqueous solution after the extraction with ether; the precipitate was filtered with suction and recrystallized from methanol. 92 g. of 2-methyl-4-diphenyl-butadiene carboxylic acid-(1) were obtained. Melting point 176–177° C.

(b) 21 g. of sodium amide were added to a solution of 91 g. of benzophenone and 70 g. of dimethylacrylic acid ethyl ester in 400 cc. of absolute benzene and maintained at room temperature for one night. After heating for one hour at 60–70° C., 1 liter of water was added. The aqueous phase was separated and acidified. After recrystallization from ethanol, 23 g. of 2-methyl-4-diphenyl-butadiene carboxylic acid-(1) were obtained from the precipitate. Melting point 176–177° C. The mixed melting point with the product obtained according to the above mentioned process showed no depression.

EXAMPLE 2

2-Methyl-4-(4',4''-Dimethoxy)-Diphenyl-Butadiene Carboxylic Acid-(1)

According to the process described in Example 1a, 52 g. of 2-methyl-4-(4',4''-dimethoxy)-diphenyl-butadiene carboxylic acid-(1) which melted at 178–180° C. were obtained from 81 g. of 4,4'-dimethoxybenzophenone, 43 g. of dimethylacrylic acid ethyl ester and 45 g. of sodium ethylate in 300 cc. of dimethylsulfoxide.

EXAMPLE 3

2-Methyl-4-(4',4''-Dichloro)-Diphenyl-Butadiene Carboxylic Acid-(1)

According to the process described in Example 1a, 132 g. of 2-methyl-4-(4',4''-dichloro)-diphenyl-butadiene carboxylic acid-(1) which melted at 185–186° C. were obtained from 127 g. of p,p'-dichlorobenzophenone and 65 g. of dimethylacrylic acid ethyl ester in 300 cc. of dimethylformamide with 50 g. of sodium methylate.

EXAMPLE 4

2-Methyl-4,4-(3'-Ethoxy-4''-Dimethylamino)-Diphenyl-Butadiene Carboxylic Acid-(1)

66 g. of potassium-tert.-butylate were added to 90 g. of 4'-dimethylamino-3-ethoxybenzophenone and 46 g. of dimethylacrylic acid ethyl ester in 200 cc. of dimethylsulfoxide while stirring and cooling. The reaction mixture was maintained for 4 hours at room temperature, diluted with 1 liter of water and filtered with charcoal. 33 g. of concentrated sulfuric acid in 200 cc. of water were added to the filtrate. The precipitate was filtered with suction and recrystallized from methanol. 86 g. of 2-methyl-4,4-(3'-ethoxy-4''-dimethylamino)-diphenyl-butadiene carboxylic acid-(1) were obtained. Melting point 128–130° C.

EXAMPLE 5

2-Methyl-4,4-(4',4''-Dichloro-3',3''-Diamino)-Diphenyl-Butadiene Carboxylic Acid (1)

To a solution of 56 g. of 4,4'-dichloro-3,3'-diaminobenzophenone and 26 g. of dimethylacrylic acid methyl ester in 150 cc. of dimethylsulfoxide were added 21 g. of sodium methylate while stirring and cooling at 20° C. The mixture was allowed to stand for 5 hours, then 1 liter of water was added, the mixture was filtered with charcoal and 25 g. of glacial acetic acid were added. The precipitate was filtered with suction and recrystallized from alcohol. 31 g. of 2-methyl-4,4-(4',4''-dichloro-3',3''-diamino)-diphenylbutadiene carboxylic acid-(1) were obtained. Melting point 215–217° C.

EXAMPLE 6

2-Methyl-4-Phenyl-4-p-Chlorophenyl-Butadiene Carboxylic Acid-(1)

34 g. of sodium methylate were added to 72 g. of 4-chlorobenzophenone and 46 g. of dimethyl acrylic acid ethyl ester in 200 cc. of dimethylsulfoxide at room temperature. After 3 hours, 3 liters of water were added, the mixture was filtered with charcoal and glacial acetic acid used in excess was added. The precipitate was filtered with suction and recrystallized from alcohol. 73 g. of 2-methyl-4-phenyl-4-p-chlorophenyl-butadiene carboxylic acid-(1) were obtained. Melting point 143–144° C.

EXAMPLE 7

2-Methyl-4-(4'-Chloro-2''-Carboxy)-Diphenyl-Butadiene Carboxylic Acid-(1)

From 87 g. of 4-chlorobenzophenone-2'-carboxylic acid and 46 g. of dimethyl acrylic acid ethyl ester in 200 cc. of dimethylsulfoxide with 54 g. of sodium methylate there were obtained according to the process described in Example 6 after recrystallization of the crude product from benzene, 47 g. of 2-methyl-4-(4'-chloro-2''-carboxy)-diphenyl-butadiene carboxylic acid-(1), which melted at 184–186° C. with decomposition.

EXAMPLE 8

2-Methyl-4-(2'-Thienyl)-Butadiene Carboxylic Acid-(1)

36 g. of sodium methylate were added to 63 g. of 2-benzoylthiophene and 45 g. of dimethylacrylic acid ethyl ester in 150 cc. of dimethylsulfoxide at room temperature. The addition being finished, the mixture was heated for one hour at 45–50° C., diluted with 2 liters of water and 100 cc. of glacial acetic acid were added. The precipitate was recrystallized from benzene. 40 g. of 2-methyl-4-(2′-thienyl)-butadiene carboxylic acid were obtained. Melting point 174–176° C.

After 24 hours and after 0.5 g. of iodine had been added, there crystallized 15 g. of a second trans-isometric compound from the mother liquor which melted at 156–158° C. The mixed melting point of the two compounds was 145–147° C.

EXAMPLE 9

*2-Methyl-4-(3′,4′-Dichloro-Phenyl)-4-(2″-Thienyl)-Butadiene-Carboxylic Acid-(1)*

9 g. of sodium methylate were added to 39 g. of 3,4-dichlorobenzoylthiophen-(2′) and 21 g. of dimethyl acrylic acid ethyl ester in 100 cc. of dimethylsulfoxide at room temperature and subsequently heated at 50° C. After adding 1 liter of water, the mixture was filtered with charcoal and acidified with glacial acetic acid. The precipitate melted at 169° C. after recrystallization from ethanol. The crude yield was 42 g.; the net yield of 2-methyl-4-(3′,4′-dichloro-phenyl-4,2″ - thienyl) - butadiene carboxylic acid-(1) was 18 g.

EXAMPLE 10

*3-Methyl-4-Thioxanthenylidene Crotonic Acid*

6 g. of thioxanthone were mixed in 20 cc. of dimethylformamide with 5 cc. of dimethyl acrylic acid methyl ester and 3 g. of sodium methylate and heated for half an hour at 60° C. After adding 100 cc. of water, the mixture was filtered and acidified with dilute sulfuric acid. Crude yield: 6.5 g. After recrystallization from ethanol, there were obtained 4.8 g. of 3-methyl-4-thioxanthenylidene crotonic acid. Melting point 195–196° C.

EXAMPLE 11

*3-Methyl-4-(2′-Chloro)-Thioxanthenylidene Crotonic Acid*

70 g. of 2-chloro-thioxanthone and 54 cc. of dimethyl acrylic acid ethyl ester were caused to react in 210 cc. of dimethylformamide and 45 g. of sodium methylate according to the process described in Example 10. 65 g. of 3-methyl-4-(2′-chloro)-thioxanthenylidene crotonic acid were obtained. Melting point 184–186° C.

We claim:

1. Butadiene carboxylic acid of the formula

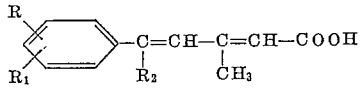

wherein R and $R_1$ are members of the group consisting of hydrogen, chloride, alkyl of 1 to 4 carbon atoms, alkoxy of 1 to 4 carbon atoms, amino, dialkylamino of 2 to 4 carbon atoms and carboxy, and $R_2$ is a member of the group consisting of thienyl-(2) and

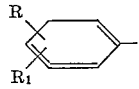

in which R and $R_1$ are as defined above.

2. 2-methyl-4-phenyl-4-p - chlorophenyl - butadiene carboxylic acid-(1).

3. 2-methyl-4-(3′,4′-dichloro-phenyl) - 4 - (2″ - thienyl)-butadiene carboxylic acid-(1).

4. 2-methyl-4-(4′,4″-dichloro-diphenyl) - butadiene carboxylic acid-(1).

References Cited in the file of this patent

UNITED STATES PATENTS

| | | |
|---|---|---|
| 2,662,914 | Robeson | Dec. 15, 1953 |
| 2,996,503 | Sprague et al. | Aug. 15, 1961 |

OTHER REFERENCES

Richter's Organic Chemistry, vol. 1, Aliphatic Series, Elsevier Publishing Co., Inc., 1944, pages 94–101.

Miller et al., Jour. Org. Chem., vol. 16, pages 1720–30 (1952).

Klemm et al., Jour. Org. Chem., vol. 23, pages 344–8 (1958).

Fieser et al., Advanced Organic Chemistry, 1961, pp. 474–75.